April 1, 1952 R. WARNECKE 2,591,322
GENERATOR OF ULTRA-SHORT ELECTROMAGNETIC WAVES
Filed July 24, 1947 3 Sheets-Sheet 1

INVENTOR:
ROBERT WARNECKE
By John B. Brady
attorney

April 1, 1952 R. WARNECKE 2,591,322
GENERATOR OF ULTRA-SHORT ELECTROMAGNETIC WAVES
Filed July 24, 1947 3 Sheets-Sheet 2
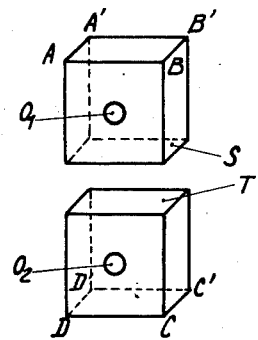
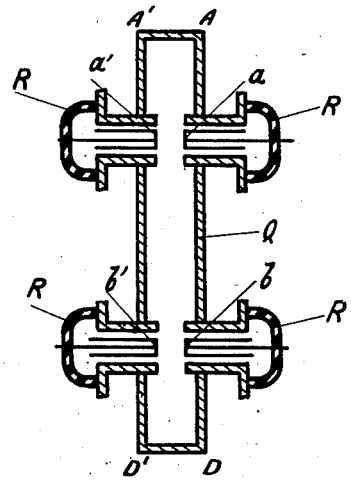
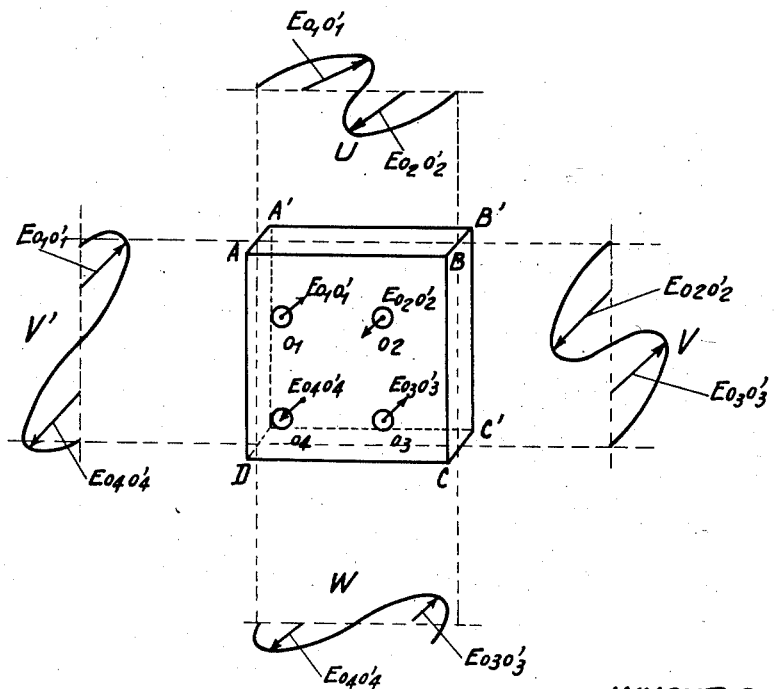
INVENTOR
ROBERT WARNECKE
By John B. Brady
Attorney April 1, 1952 — R. WARNECKE — 2,591,322
GENERATOR OF ULTRA-SHORT ELECTROMAGNETIC WAVES
Filed July 24, 1947

INVENTOR:
ROBERT WARNECKE

Patented Apr. 1, 1952

2,591,322

UNITED STATES PATENT OFFICE 2,591,322

GENERATOR OF ULTRA-SHORT ELECTROMAGNETIC WAVES

Robert Warnecke, Paris, France, assignor to Compagnie Generale De Telegraphie Sans Fil, a corporation of France Application July 24, 1947, Serial No. 763,398
In France August 30, 1946

3 Claims. (Cl. 315—6)

This invention relates to electronic generators of electromagnetic waves of very high frequencies of the order of 4 to 5,000 megacycles per second or more. By using the invention it is possible to obtain, within this range, outputs of high frequency energy considerably greater than those obtainable with apparatus hitherto known. Moreover the generators according to the invention have the advantage that their construction is simple and robust.

The present invention is based on the use within the same single apparatus of a plurality of push-pull electronic systems with secondary emission. These systems are combined with a single resonating cavity having the characteristic of oscillating at a frequency different from the fundamental frequency.

The whole is operated in such a manner that all the electronic beams traverse the oscillating member at points where, owing to the oscillation, there is produced concentrations of electric energy of high frequency, that is to say at points where crests of the high frequency electric field are produced.

The invention is more particularly hereinafter described with reference to the accompanying drawings, in which:

Figs. 3 and 4 illustrate diagrammatically the mode of vibration of the apparatus shown in Fig. 1;

Fig. 5 shows an arrangement constituted by four push-pull systems of electrodes with secondary emission;

Fig. 6 shows a modification of the apparatus shown in Fig. 1;

Figure 1:
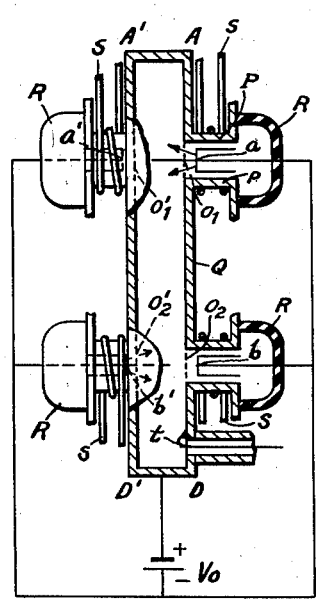
Figure 1 is a section through an apparatus using two push-pull systems of electrodes with secondary emission.
Figure 7:
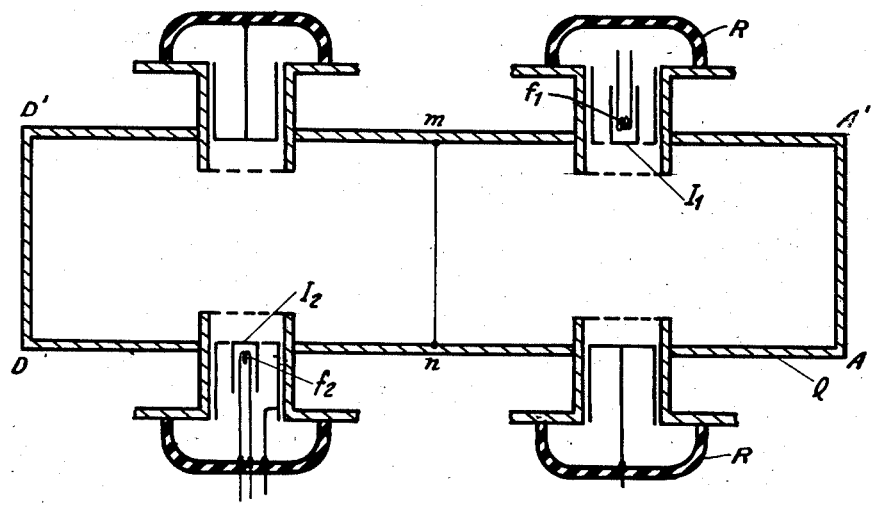
Figure 8:
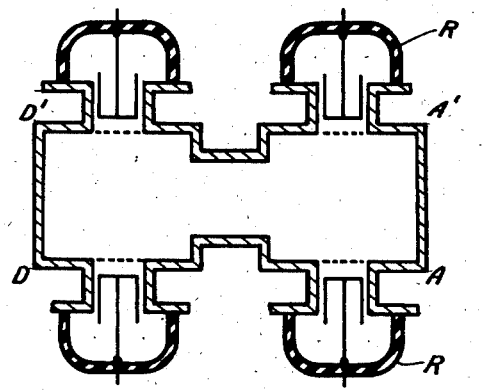

Fig. 7 relates to accessory devices with which the apparatus shown in Figs. 1 and 6 may be provided; and Fig. 8 is a modification of the apparatus shown in Figs. 1 and 6.

Figure 2:
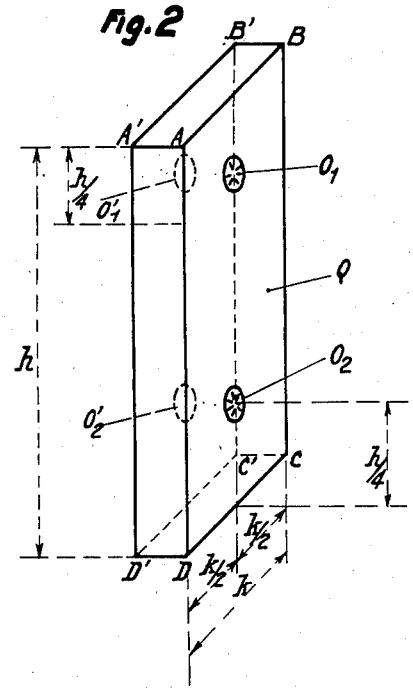
Fig. 2 is a perspective diagrammatic illustration separate from the remainder of the mounted apparatus, the box shown constituting the body of the apparatus shown in Fig. 1.

The principle of the apparatus will now be described with reference to Figs. 1 and 2.

In Fig. 1, which shows in section two push-pull systems of electrodes with secondary emission, these electrodes are for example constituted by small circular plates $a$, $a'$ and $b$, $b'$. Q is a closed box forming a resonating cavity the inside of which is evacuated; this box constitutes the oscillating member of the system and it is shown diagrammatically in Fig. 2 separate from the whole system. It will be seen from the drawing that the box is provided with two groups of holes $O_1$, $O'_1$, $O_2$ and $O'_2$. These holes may be latticed and allow the electrons to pass from $a$ to $a'$ or vice versa and from $b$ to $b'$ or vice versa.

The box Q is for example made of a sheet of copper but it may also be made of sheets of any other metal provided that they are covered on the inner side of the box with a layer which is a good conductor for high frequency currents. The box may be even made of metal, a ceramic substance or any other material which would permit of obtaining a vacuum tight enclosure provided the conducting line is also used. In all cases the materials employed are preferably non-magnetic for reasons which will be explained presently.

The openings $O_1$, $O'_1$ and $O_2$, $O'_2$ are provided for the passage of electrons and consequently the corresponding emitting electrodes $a$ and $a'$, $b$ and $b'$ are such that the electrons can react during their passage through the box with the high frequency electric field so that the exchange of energy shall be a maximum. It is to be understood that according to the essence of the invention above mentioned, the vibration within the box Q is effected on a frequency which is different from the fundamental one. In the case of the apparatus represented in Figs. 1 and 2 the axes respectively passing through the centers of the openings in question will be determined as follows: The axis passing through the centers of $O_1$ and $O'_1$ will be the intersection of a plane perpendicular to the bases ABCD and A'B'C'D' and passing through the centres of AB and CD with a plane also perpendicular to ABCD and A'B'C'D', parallel to the base AA'B'B and at a distance of $h/4$ from the said base, $h$ being the total length of a corner such as AD. Similarly the axis passing through the centers of $O_2$ and $O'_2$ will be the intersection of the same plane perpendicular to the bases of ABCD and A'B'C'D' and passing through the centers of AB and CD with a plane perpendicular to ABCD and A'B'C'D', parallel to the base DD'C'C and at a distance $h/4$ from the said base.

Figure 3:
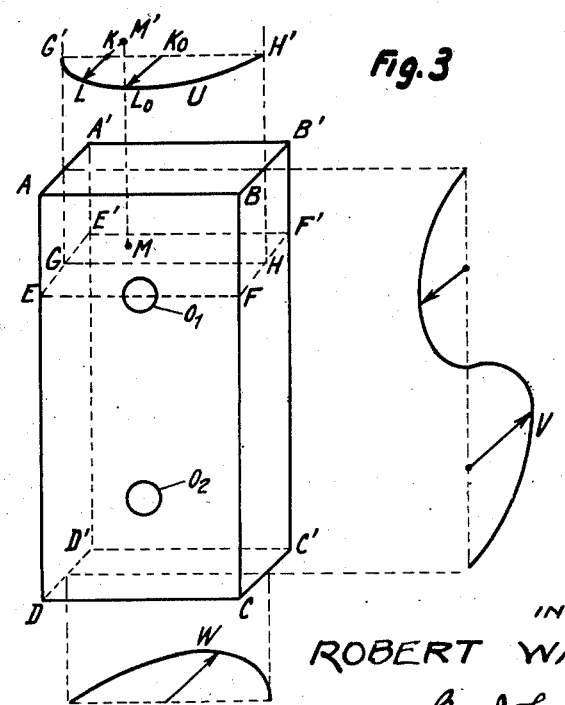

A continuous source of voltage $V_0$ produces the energy required for sustaining the oscillations. Its positive pole is connected to the conducting mass of the box Q and its negative pole to four emitting electrodes $a$, $a'$, $b$, $b'$. The mode of vibration of the oscillating member is diagrammatically illustrated by the distribution of the electric fields shown in Fig. 3. In the latter view the box Q is again shown in profile but facing with one of its large surfaces on which the openings $O_1$ and $O_2$ are visible.

The curve U lying in a plane parallel to AA'B'B shows the instantaneous distribution of the electric field in the plane EE'F'F also parallel to AA'B'B and passing through the centres of $O_1$ and $O'_1$. In order to find the field in the point M of this plane, situated in the interior of the box Q the procedure is as follows: A straight line is drawn parallel to AA' and BB' through the point M' which is a projection of M in the plane of U. The portion KL of the said straight line, limited by the median G'H' and by the curve U, is proportional to the instantaneous value of the field at the point M. In consequence thereof the vector of maximum length $K_0L_0$ represents the maximum intensity of the field along the line joining the centres of $O_1$ and $O'_1$. Likewise the curve W represents the distribution at the same instant of the field in a plane parallel to AA'B'B and passing through the center of $O_2$ and $O'_2$. Following the same representation the curve V, situated in a plane parallel to BB'C'C represents the distribution of the field at the same instant as the two curves just referred to in a plane parallel to BB'C'C and passing through the centres of $O_1$, $O'_1$ and $O_2$, $O'_2$.

These different diagrams prove the fact that the plane parallel to AA'B'B and passing through the center of the large sides AD and BC is a plane of symmetry. At the level of this plane the electric field is always nil. One can thus imagine the system shown in Fig. 1 as being the resultant of the juxtaposition of the two systems shown in Fig. 4, the intermediate walls S and T being suppressed. This supression is possible because the surface currents in these walls are in the opposite phase and of equal amplitude if the electronic excitations across $O_1$, $O'_1$ and $O_2$, $O'_2$ are themselves of equal intensity and of opposite phase.

The operation of the apparatus shown in Fig. 1 may be explained as follows:

The continuous voltage $V_0$ is applied between the box Q and the emitting electrodes aa'bb'. A magnetic field is produced for example by means of electromagnets shown in Fig. 1 in such a manner that the lines of force of the said field are parallel to the axes connecting the centers of a and a' on the one hand and b and b' on the other hand. Other means may be used for guiding the electrons.

If it is assumed that one of the emitting electrodes a emits first of all a small number of electrons such as photoelectrons, cold emission electrons, etc. these electrons are accelerated towards the opening $O'_1$, latticed or not, and they are displaced approximately in a straight line under the action of a magnetic field or any other focussing system. A portion of these electrons impinge thus on the opposite electrode a'. The secondary electrons which are liberated on a' return towards a and so on; the electronic current that circulates between the anodes continues to increase in intensity until it is limited either by the coefficient of secondary emission of a and a' or by the space charge. The maintenance of the oscillations is effected under this to and fro action, the mode of operation being similar to the Barkhausen valve with this difference that in this case the electrons do not return along the way before arriving at the electrodes; on the contrary with each half period of oscillation a new electronic flux is produced and participates to the maintenance of the oscillations. A control of the emission is thus produced in synchronism with the duration of the electronic passage according to the general mechanism of all dynamic multipliers with secondary emission. The first pair of emitting electrodes which commences to oscillate drags on the others; this dragging along is effected by itself according to the distribution of the fields, which is caused by the disposition of the electronic systems in the box. The stable state of oscillation is attained when the assumed elementary cells which are adjacent vibrate in opposite phase and it is thus possible to produce systems comprising a greater number of cells than the elementary system shown in Figs. 1 and 2.

For example, Fig. 5 shows a system with four electronic devices which can be imagined to be split into four elementary cells of square cross section. One can imagine them as the side by side juxtaposition of two oscillators such as shown in Fig. 1, their assumed plane of separation being one which passes through the centers of the straight lines AB, A'B', DC and D'C' of Fig. 5. Here we have four groups of openings: $O_1$ lying opposite $O'_1$; $O_2$ lying opposite $O'_2$; $O_3$ lying opposite $O'_3$, and finally $O_4$ lying opposite $O'_4$. The exchange of electrons in each one of these systems is effected in the manner above described in connection with the systems $O_1$, $O'_1$ and $O_2$, $O'_2$ of Fig. 1.

The diagrams U, V, V' and W respectively represent the instantaneous values of the electric field in the following planes: the plane passing through the centers of $O_1$, $O'_1$, $O_2$ and $O'_2$, thus parallel to AA'B'B; the plane passing through the centers of $O_2$, $O'_2$, $O_3$ and $O'_3$, thus parallel to BB'C'C; the plane passing through the centers of $O_1$, $O'_1$, $O_4$ and $O'_4$, thus parallel to the preceding plane passing through the centers of $O_3$, $O'_3$, $O_4$ and $O'_4$, thus parallel to the first one. The meaning of these different curves will be understood from the explanation above given in connection with Fig. 3. More particularly the vectors of maximum length, respectively represent, as shown in the drawing, the instantaneous values of the electric field on the lines $O_1$, $O'_1$, $O_2$, $O'_2$, $O_3$, $O'_3$, $O_4$ and $O'_4$.

The four diagrams show different phase relations. They also show that the electric field is constantly zero in the two following planes: The plane which passes through the centers of the four corners AD, A'D', BC and B'C' and the plane passing through the centers of the corners AB, A'B', D'C' and DC.

It has been mentioned above with reference to Fig. 1 that the walls of the oscillatory box Q should preferably be of a non-magnetic material. Indeed, the walls must not form a screen with respect to the magnetic field to be used, so that the electronic trajectories remain substantially rectilinear and parallel to the axes passing through the centers of the emitting electrodes.

The emitting electrodes should be connected as regards the high frequency to the oscillatory box, but they have to be insulated to allow of their being continuously polarized. The said electrodes are therefore separated from the sides of the box by very large capacities presenting a small impedance for ultra high frequencies. In the system according to Fig. 1 for example, the emitting electrodes a, a', b, b' constitute the bottom of a cylindrical condenser P, one of the armatures p of which is connected with the box.

It is to be emphasized that the exchange of energy between the electronic fluxes, passing from each emitting electrode to the opposite one, and the high frequency field is connected with the creation of electronic groups moving in the spaces where the high frequency field is active. One could, therefore, in certain cases, favor such groupings by the delimitation of space more or less exempt of a field of high frequency between the walls of the oscillating box and the emitting surfaces. Such an arrangement is also provided by the present invention.

It is to be understood that the arrangements hereinbefore described may be modified. Any number of electronic devices may be used according to the invention; and the oscillating box and the emitting electrodes may be made of any possible shapes so long as oscillations can be maintained.

More particularly the emitting surfaces may be incorporated in the walls of the box or be deposited thereon.

The box may also be provided with hollow reentrant parts where the openings are provided in order that, everything else being equal, the time of passage of the electrons can be controlled. Such an arrangement is shown in Fig. 6 illustrating in section a system of the same kind as shown in Fig. 1.

Referring to Figs. 1 and 6 R are dome-shaped members of insulating material serving as a support for the emitting electrodes. These dome-shaped members close and complete the vacuum enclosure constituted by the cavity Q.

In the apparatus forming the subject of the present invention the electron emitting electrodes may be made of any suitable material which has a coefficient of secondary emission greatly superior to unity for the electronic speeds that are used. Preferably they may be constituted by alloys such as those described in the U. S. Patents Nos. 2,189,971 and 2,189,972, alloys which retain their effectiveness at relatively high temperatures and which can conveniently be used.

In order to facilitate the starting at the beginning of the operation, it may be useful to provide for the incorporation in one or several of the electrodes with secondary emission one or more small incandescent cathodes the heating of which may be interrupted when the oscillations have started. By way of example, two such starting electrodes are diagrammatically illustrated in Fig. 7 in which as in the case of Figs. 1 and 6 a profile section shows an apparatus with two push-pull systems using for example a cavity of the same kind as the one shown in Fig. 2. In addition to the elements already described, Fig. 7 shows the incandescent cathodes $I_1$, $I_2$; they may, for example, comprise small balls covered with emitting oxides and heated by the filaments $f_1$, $f_2$.

The applicant's researches have proved that in certain cases the operation of the apparatus above described may not agree to theoretical expectations, and more particularly that it may not agree to the distribution of the field of the kind hereinbefore indicated. It has also been found that once the oscillations have been started they may not be stable and may for instance change their frequency suddenly.

The invention thus comprises means for preventing such disturbances. These means are generally of the kind which are used in magnetrons with multiple cavities. The most simple one of those capable of being used in the apparatus above described consists in connecting the opposite walls provided with the openings for the passage of the electrons by one or more junctions, constituted by thin wires placed in the assumed surface of separation into elementary cells. Such a wire is shown at $mn$ in Fig. 7 which connects, for instance, the points of intersection of the diagonals of the large sides ABCD and A'B'C'D' of the box Q, the references being the same as in the case of Figs. 1 and 2.

Another method for eliminating certain undesirable frequencies, or for stabilizing the frequency, consists in making the profile of the walls of the cavity of a "disconnected" shape as indicated diagammatically in Fig. 8 which is a view corresponding to those of Figs. 1 and 6.

The disconnections may be used for several purposes, more particularly in order to ensure that each assumed elementary cell shall be separated from those adjacent thereto by more or less large spaces which do not oscillate but serve through the intermediary of the effects of the limitation of the field as coupling elements between the active cells.

In any case whether these separating spaces are provided or not, in an apparatus according to the present invention the assumed elementary cells oscillate and are coupled with one another naturally by their high frequency fields. It is therefore sufficient to use one device for removing the energy with the purpose of using it. This device, as illustrated in Fig. 1, may for instance consist of a wire loop encircling a flux of a high frequency magnetic field at a suitable point in the box forming the oscillator.

According to a modification of the invention the cavity where the oscillations are generated need not constitute itself a vacuum enclosure. The electrode systems could then be mounted in separate vacuum enclosures constructed in such a manner as to allow of the principles of the invention hereinbefore described to be applied.

I claim:

1. A generator of ultra-short electromagnetic waves, comprising a casing having electrically conductive non-magnetizable walls forming a single cavity resonator, the opposite walls of the said cavity resonator being perforated with an even number of openings closed by grids, the said openings being disposed in pairs facing each other and situated at the points corresponding to the maxima of the high-frequency electric field to be generated inside the said cavity resonator, secondary emission cathodes of a number equal to that of the said openings and disposed adjacent the openings and facing the latter externally of the said cavity resonator, means producing a magnetic field aligned with the cathodes and grids for focusing the electron beams produced by the said cathodes and traversing the said cavity resonator through the said openings, means excited by the high frequency field within the said cavity resonator for tapping the high-frequency energy produced by the said beams and a source of continuous potential whose positive pole is connected with the said cavity resonator and whose negative pole is connected with the said cathodes.

2. A generator of ultra-short electromagnetic waves as set forth in claim 1, wherein heating filaments are provided adjacent certain of the secondary emission cathodes said filaments being fed by an external source of current.

3. A generator of ultra-short electromagnetic waves as set forth in claim 1, wherein at least one conducting wire within the cavity resonator connects the perforated walls of said cavity resonator together, said wire being situated in the plane of symmetry between two adjacent pairs of said openings.

ROBERT WARNECKE.

REFERENCES CITED

The following references are of record in the file of this patent:

UNITED STATES PATENTS

| Number | Name | Date |
|---|---|---|
| 2,278,210 | Morton | Mar. 31, 1946 |
| 2,409,038 | Hansell | Oct. 6, 1946 |
| 2,438,194 | Steel, Jr., et al. | Mar. 23, 1948 |
| 2,460,498 | Ginzton | Feb. 1, 1949 |